(12) United States Patent
Kuwahara et al.

(10) Patent No.: US 10,256,691 B2
(45) Date of Patent: Apr. 9, 2019

(54) MOTOR WIRING STRUCTURE

(71) Applicant: NISSAN MOTOR CO., LTD., Yokohama-shi, Kanagawa (JP)

(72) Inventors: Takashi Kuwahara, Isehara (JP); Shigeru Ishii, Atsugi (JP); Yasunori Ishibashi, Kawasaki (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 881 days.

(21) Appl. No.: 14/380,976

(22) PCT Filed: Mar. 1, 2013

(86) PCT No.: PCT/JP2013/055657
§ 371 (c)(1),
(2) Date: Aug. 26, 2014

(87) PCT Pub. No.: WO2013/129647
PCT Pub. Date: Sep. 6, 2013

(65) Prior Publication Data
US 2015/0008776 A1    Jan. 8, 2015

(30) Foreign Application Priority Data
Mar. 2, 2012    (JP) ................................. 2012-046161

(51) Int. Cl.
*H02K 3/28*    (2006.01)
*H02K 9/22*    (2006.01)
(Continued)

(52) U.S. Cl.
CPC ............... *H02K 3/28* (2013.01); *H02K 3/522* (2013.01); *H02K 15/0075* (2013.01); *H02K 9/22* (2013.01)

(58) Field of Classification Search
CPC ............ H02K 3/28; H02K 3/52; H02K 3/522; H02K 3/50; H02K 3/505; H02K 3/51;
(Continued)

(56) References Cited

U.S. PATENT DOCUMENTS

| 4,601,424 A * | 7/1986 | Adwalpalker ....... B23K 20/233 |
| | | 205/126 |
| 2004/0070293 A1* | 4/2004 | Kabasawa .............. H02K 3/522 |
| | | 310/71 |

(Continued)

FOREIGN PATENT DOCUMENTS

| JP | 2006-238641 A | 9/2006 | |
| JP | 2007159192 A * | 6/2007 | ............... H02K 3/28 |
| KR | 20070010398 A * | 1/2007 | |

OTHER PUBLICATIONS

Baek (KR 20070010398 A) English Translation.*
Yamazaki (JP 2007159192 A) English Translation.*

*Primary Examiner* — Quyen P Leung
*Assistant Examiner* — Robert E Mates
(74) *Attorney, Agent, or Firm* — Foley & Lardner LLP

(57) ABSTRACT

A motor wiring structure of the present invention relates to motor wiring for supplying electric power to coils which are respectively wound around split cores provided in a stator. The motor wiring structure includes a power supply-side terminal disposed on a power supply side, multiple coil connection-side terminals configured to be connected respectively to winding wire terminals of the coils, and multiple conductor wires each independently connecting the power supply-side terminal and one of the multiple coil connection-side terminals to each other. Moreover, the motor wiring structure includes a positioning and heat-dissipating protrusion which is provided to the coil connection-side terminal, and which is configured to position the (Continued)

coil connection-side terminal with respect to the stator and dissipate heat during thermal crimping with the coil.

5 Claims, 4 Drawing Sheets

(51) Int. Cl.
*H02K 3/52* (2006.01)
*H02K 15/00* (2006.01)

(58) Field of Classification Search
CPC ...... H02K 5/22; H02K 5/225; H02K 15/0075; H02K 9/22
USPC .................................. 310/71, 179, 184, 208
See application file for complete search history.

(56) References Cited

U.S. PATENT DOCUMENTS

| | | | |
|---|---|---|---|
| 2007/0052307 A1* | 3/2007 | Yoshida | H02K 5/225 310/71 |
| 2010/0001610 A1* | 1/2010 | Iki | H02K 3/26 310/208 |
| 2011/0021092 A1* | 1/2011 | Ukai | H01R 4/185 439/877 |

* cited by examiner (a)

(b)

(c)

ures of the drawings are exaggerated for the convenience of description, and may be different from actual ones.

MOTOR WIRING STRUCTURE

TECHNICAL FIELD

The present invention relates to a motor wiring structure.

BACKGROUND ART

For AC motors used for electric automobiles and the like, a structure disclosed in Patent literature 1 is employed, for example. Specifically, a structure in which multiple bus bars are integrated with a bus ring having a ring shape is proposed as wiring for supplying electric power to coils in coil blocks.

CITATION LIST

Patent Literature

Patent Literature 1: Japanese Patent Application Publication No. 2006-238641

SUMMARY OF INVENTION

The bus ring of Patent Literature 1 uses a single wire to supply all electric power to the multiple coils. In addition, in order to cope with sufficient power supply to the multiple coils, the wire used is thick. In this structure, the wire has an increased strength and hence has a high rigidity. Accordingly, vibration generated by the coils is transmitted directly to a power source terminal. Consequently, a terminal block to which the power source terminal is fixed is worn because of the vibration, and eventually a contact failure is caused. In addition, a screw fastening a contact of the terminal block may come off because of the vibration.

The present invention has been made to solve the above described problems. An object of the present invention is to provide a motor wiring structure by which vibration generated by coils of a stator is damped to prevent a contact failure between a power supply-side terminal and a terminal block as well as loosening of a screw fastening a contact of the terminal block.

Specifically, the present invention relates to motor wiring for supplying electric power to coils which are respectively wound around split cores provided in a stator. Moreover, the motor wiring include a power supply-side terminal disposed on the power supply side, multiple coil connection-side terminals configured to be connected respectively to winding wire terminals of the coils, and multiple conductor wires each independently connecting the power supply-side terminal and one of the multiple coil connection-side terminals to each other. Furthermore, the motor wiring includes a positioning and heat-dissipating protrusion which is provided to the coil connection-side terminal and which is configured to position the coil connection-side terminal with respect to the stator and to dissipate heat during thermal crimping with the coil.

DESCRIPTION OF EMBODIMENTS

Figure 1:
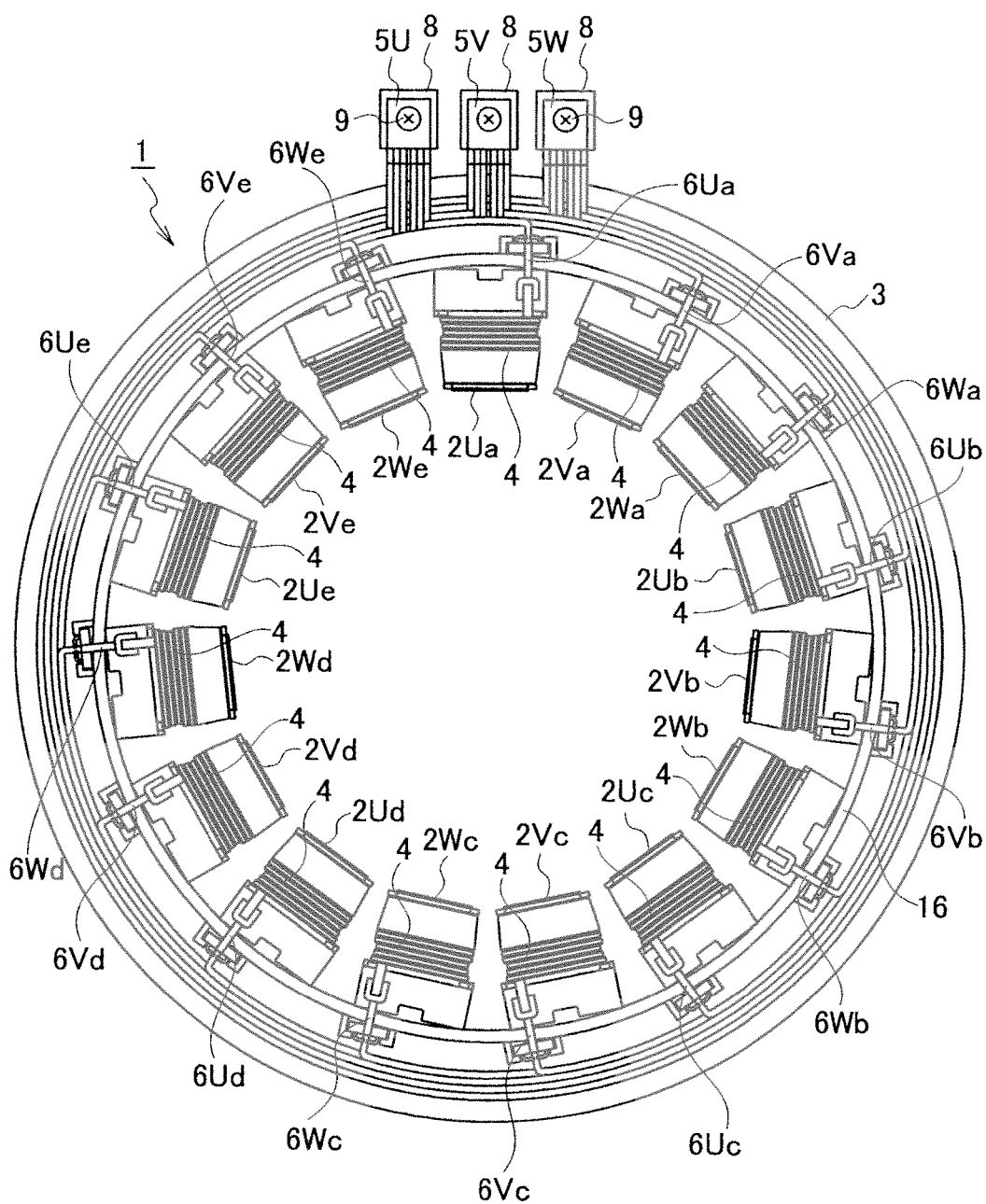
FIG. 1 is a plan view of a motor wiring structure according to one embodiment of the present invention.

Hereinafter, a motor wiring structure according to one embodiment of the present invention will be described in detail with reference to the drawings. Note that the dimensional ratios in the drawings are exaggerated for the convenience of description, and may be different from actual ones.

A motor wiring structure of this embodiment can be applied to, for example, a three-phase AC motor shown in FIG. 1. As shown in FIG. 1, a stator 1 may include multiple split cores 2 provided independently of each other. In the example of FIG. 1, five split cores are provided for each phase, namely, U-phase split cores 2Ua to 2Ue, V-phase split cores 2Va to 2Ve, and W-phase split cores 2Wa to 2We. Accordingly, the number of the split cores 2 is 15.

The split cores 2 are attached at regular intervals onto an inner peripheral surface of a holder 3 having a ring shape. In addition, the U-phase, V-phase, and W-phase split cores 2 are repeatedly arranged clockwise in this order in FIG. 1. In addition, a coil 4 is wound around each of the split cores 2.

Figure 2:
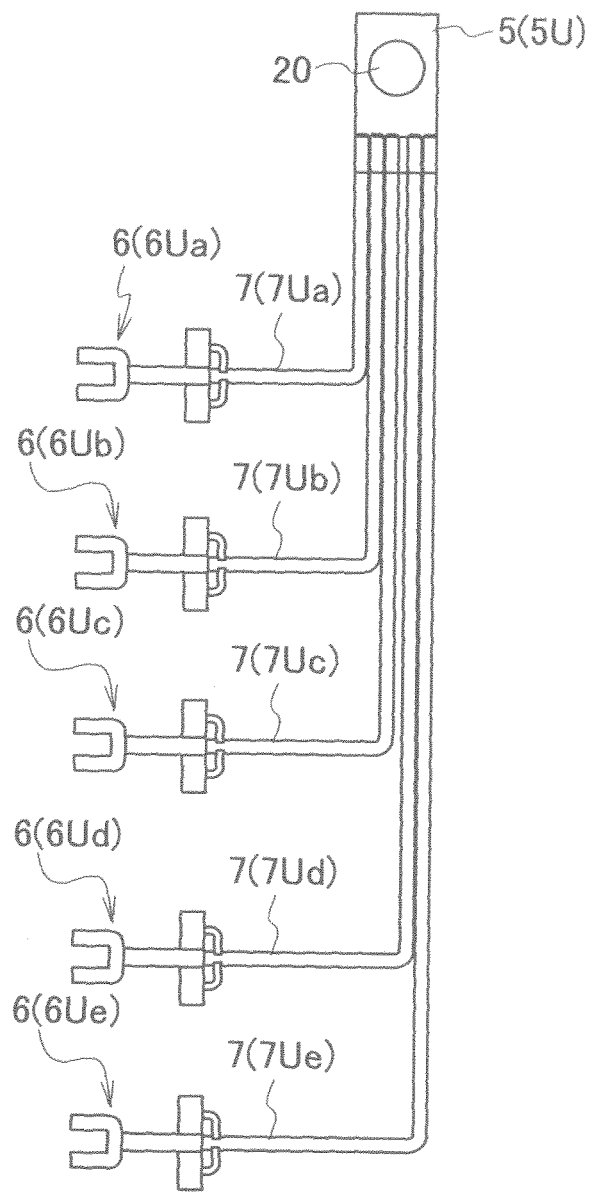
FIG. 2 is a plan view of a wiring unit attached in the motor wiring structure of FIG. 1.

Wiring units for supplying electric power to the coils 4 wound around the split cores can be configured as shown in FIG. 2. In FIG. 2, a wiring unit of the U-phase is shown. Note that wiring units for the V-phase and W-phase can have the same structure as that of the U-phase in FIG. 2. Hence, the wiring units of the V-phase and the W-phase are not illustrated. The wiring unit of the U-phase includes a power supply-side terminal 5 (5U) on the power supply side and multiple coil connection-side terminals 6 (6Ua to 6Ue) configured to be connected respectively to winding wire terminals of the coils 4 of the split cores 2 (2Ua to 2Ue). Moreover, multiple conductor wires 7 (7Ua to 7Ue) each independently connect the single power supply-side terminal 5U to one of the multiple coil connection-side terminals 6Ua to 6Ue.

The power supply-side terminal 5 (5U) can be formed of, for example, a surface-coated copper plate, and is fixed to a terminal block 8 on the power source side shown in FIG. 1 by a screw 9. In this power supply-side terminal 5 (5U), a screw hole 20 for inserting the screw 9 therethrough is formed.

Figure 3:
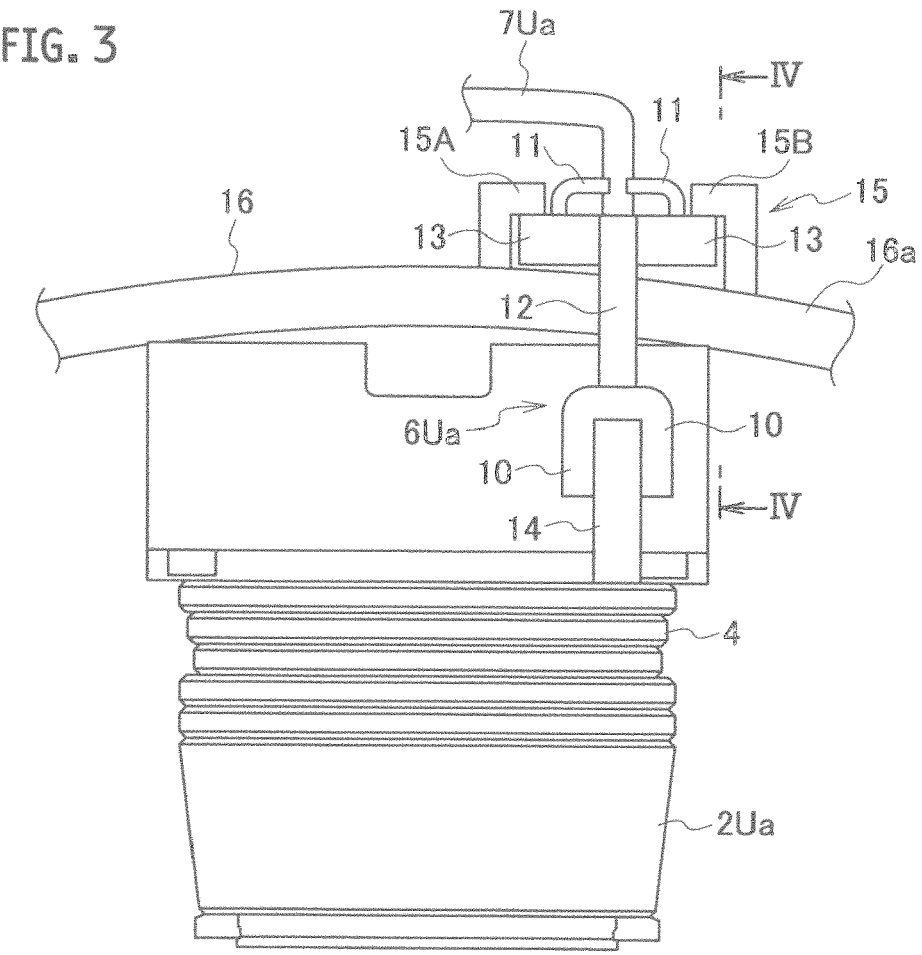
FIG. 3 is an enlarged plan view showing a state of a coil connection-side terminal arranged in the motor wiring structure of FIG. 1.
Figure 4:
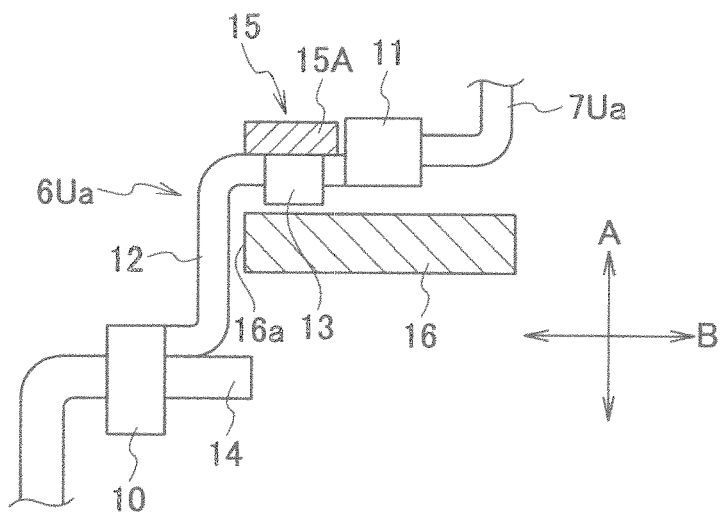
FIG. 4 is a cross-sectional view taken along the line IV-IV of FIG. 3.
Figure 5:
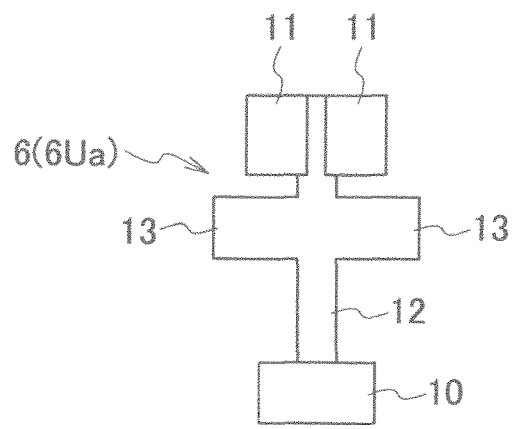
FIG. 5 is a plan view of a coil connection-side terminal in FIG. 1, part (b) of FIG. 5 is a front view of the coil connection-side terminal in FIG. 1, and part (c) of FIG. 5 is a side view of the coil connection-side terminal in FIG. 1.
Figure 5:
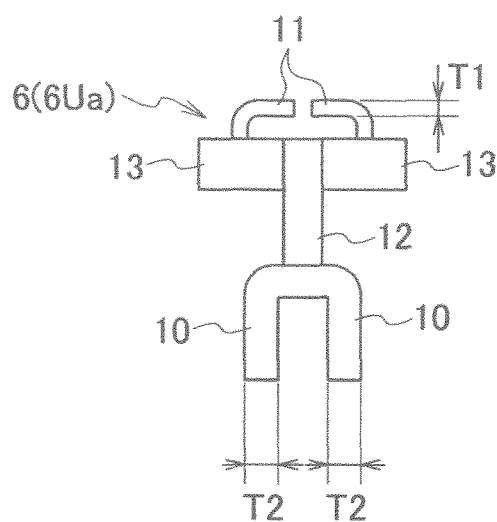
Figure 5:
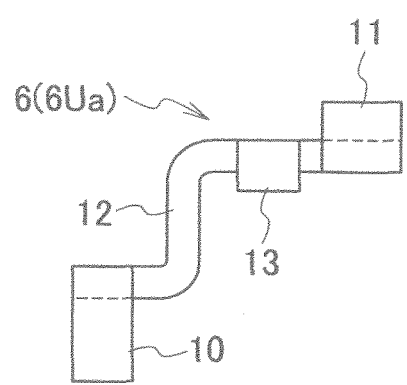

As shown in FIGS. 3 to 5, each of the coil connection-side terminals 6 (6Ua to 6Ue) may include a thermocompression bonding portion 10 configured to be thermocompression bonded to the winding wire terminal of the coil 4 and a crimping portion 11 crimping the conductor wire 7 (7Ua to 7Ue). Moreover, the coil connection-side terminal 6 may includes a joint portion 12 joining the thermocompression bonding portion 10 and the crimping portion 11 to each other. In addition, a positioning and heat-dissipating protrusion 13 can be provided on the joint portion 12. Each of the coil connection-side terminals 6 (6Ua to 6Ue) can be formed of a surface-coated copper plate as in the case of the power supply-side terminal 5 (5U). Specifically, the coil connection-side terminal 6 can be formed by punching and bending the copper plate.

The thermocompression bonding portion 10 can be electrically connected to an external terminal 14 provided in the winding wire terminal of the coil 4 by inserting the external terminal 14 in the thermocompression bonding portion 10 and then thermocompression-bonding the external terminal 14 and the thermocompression bonding portion 10 to each other, lire thermocompression bonding portion 10 can be formed in an inverted U-shape to sandwich the external terminal 14. Meanwhile, the crimping portion 11 can be connected to the conductor wire 7 (7Ua to 7Ue) by crimping crimping pieces on both sides of the crimping portion 11. In addition, the joint portion 12 can be formed in a crank shape joining the thermocompression bonding portion 10 and the crimping portion 11 to each other.

In the motor wiring structure of this embodiment, the positioning and heat-dissipating protrusion 13 can be fixed by being engaged in a terminal mount portion 15 formed in the holder 3 attached to the stator 1. In the example shown in FIGS. 3 to 5, the positioning and heat-dissipating protrusion 13 is formed to stick out on both sides from the joint portion 12, and the joint portion 12 and the positioning and heat-dissipating protrusion 13 together form a cross shape in a plan view. In addition, in the example shown in FIG. 3, the terminal mount portion 15 has two locking claws 15A and 15B provided to extend from an annular frame 16 formed in the holder 3. In this example, the locking claws ISA and are formed in inverted L-shapes facing each other.

The positioning and heat-dissipating protrusion 13 can be fixed by being inserted between the two locking claws 15A and 15B formed in the terminal mount portion 15. The fixation in such a manner makes it possible to restrict positional shift of the positioning and heat-dissipating protrusion 13 in a direction away from the annular frame 16. In other words, it is possible to restrict the movement of the positioning and heat-dissipating protrusion 13 in the vertical direction indicated by the arrow A in FIG. 4. In addition, the terminal mount portion 15 can be formed such that the crimping portion 11 is brought into contact with the two locking claws 15A and 15B, when the coil connection-side terminal 6 (6Ua to 6Ue) moves toward a top end of the annular frame 16. This configuration makes it possible to prevent the coil connection-side terminal 6 (6Ua to 6Ue) from getting out in a direction toward the top end of the annular frame 16. In other words, it is possible to restrict the movement of the positioning and heat-dissipating protrusion 13 in the left direction indicated by the arrow B of FIG. 4. Moreover, a configuration may be employed by which the joint portion 12 is brought into contact with a top end surface 16a of the annular frame 16, when the coil connection-side terminal 6 (6Ua to 6Ue) moves toward a lower end of the annular frame 16. This configuration makes it possible to prevent the coil connection-side terminal 6 (6Ua to 6Ue) from getting out in a direction toward the lower end of the annular frame 16. In other words, it is possible to restrict the movement of the positioning and heat-dissipating protrusion 13 in the right direction indicated by the arrow B of FIG. 4. The above-described configuration makes it possible to position and fix the positioning and heat-dissipating protrusion 13 at a predetermined position of the annular frame 16 and hence position and fix the coil connection-side terminal with respect to the stator. As a matter of course, the above-described embodiment is a mere example, and modes of the positioning and fixation are not limited to the above-described configuration.

The thermocompression bonding portion 10 can be connected by thermocompression bonding to the external terminal 14 provided in the winding wire terminal of the coil 4 made of a rectangular wire. The thermocompression bonding is a technology in which surfaces of terminals are melted by heating, and the terminals are bonded under pressure to each other. Meanwhile, since each of the conductor wares is formed of a flexible stranded wire, the crimping portion 11 can be connected to the conductor wire by crimping for compression bonding.

In general, in thermocompression bonding or thermal crimping, the thermal expansion of the crimping member may cause decrease in the compression bonding force. Moreover, quenching the crimping member may cause embrittlement, so that the crimping for compression bonding cannot be performed normally. On the other hand, in the motor wiring structure of this embodiment, heat during the thermocompression bonding is dissipated by the positioning and heat-dissipating protrusion 13 to avoid excessive heat transfer to the crimping portion 11. This makes it possible to secure a plate thickness or heat capacity of the thermocompression bonding portion 10 optimum for the thermocompression bonding, and also secure a plate thickness of the crimping portion 11 optimum for the crimping for the compression bonding, from such viewpoints, the plate thickness T1 of the crimping portion 11 can be smaller than the plate thickness T2 of the thermocompression bonding portion 10. For the thermocompression bonding portion 10 to be heated, such a configuration makes it possible to select a plate thickness T2 according to a plate thickness or heat capacity optimum for fusing. Moreover, for the crimping portion 11, it is possible to select a plate thickness T1 according to a plate thickness optimum for the crimping for compression bonding.

According to the motor wiring structure configured as described above, the conductor wires 7 for supplying electric power from the power supply side to the coils 4 formed in the split cores 2 are independent of each other. For this reason, the electric power supplied per conductor wire decreases, and the conductor wires 7, which are thinner and more flexible than those in conventional structures, can be used. In addition, the flexible conductor wires 7 damp the vibration generated by the coils 4 wound around the split cores 2. Hence, it is possible to prevent the contact failure due to wearing of the terminal block 8 caused by the vibration and the coming-off of the screw 9 fastening the power supply-side terminal.

In addition, according to the motor wiring structure of this embodiment, the positioning and heat-dissipating protrusion 13 is provided to each of the coil connection-side terminals 6. For this reason, the positioning and heat-dissipating protrusion 13 dissipates the heat during the thermal crimping, which makes it possible to prevent excessive heat transfer to the crimping portion 11. Moreover, besides the dissipation of heat during the thermal crimping, the positioning and heat-dissipating protrusion 13 can also function to position the coil connection-side terminal 6 in the stator 1.

In addition, in the motor wiring structure of this embodiment, the positioning and heat-dissipating protrusion 13 dissipates heat during the thermal crimping. Hence, it is unnecessary to take excessive heat transfer to the crimping portion 11 into consideration, and the plate thickness T1 of the crimping portion 11 can be smaller than the plate thickness T2 of the thermocompression bonding portion 10. With this configuration, the thermocompression bonding portion 10 can have a plate thickness optimum for the thermocompression bonding. Moreover, the crimping portion 11 can have a plate thickness optimum for the crimping operation.

In addition, in the motor wiring structure of this embodiment, each of the coil connection-side terminals 6 can be fixed by engaging the positioning and heat-dissipating protrusion 13 in the terminal mount portion 15 formed in the holder 3 attached to the stator 1. This configuration makes it possible to prevent the coil connection-side terminals 6 from coming off from the holder 3 due to the vibration.

Contents of the present invention are described above based on the embodiment. However, it is obvious to those skilled in the art that the present invention is not limited to die description, but may be altered or modified in various manners.

The entire content of Japanese Patent Application No. 2012-046161 (filed on Mar. 2, 2012) is incorporated herein by reference.

INDUSTRIAL APPLICABILITY

In the motor wiring structure according to the present invention, the configuration is employed in which the conductor wires for supplying electric power from a power supply side to coils formed in split cores are independent of each other. For this reason, the electric power supplied per conductor wire decreases, and conductor wires thinner and more flexible than those in conventional structures can be used. Flexible conductor wires damp the vibration generated by coils which are respectively wound around split cores. Hence, it is possible to prevent the contact failure due to wearing of a terminal, block caused by the vibration and also the coming-off of a screw fixing a power supply-side terminal due to the vibration.

REFERENCE SIGNS LIST

1 stator
2 split core
3 holder
4 coil
5 power supply-side terminal
6 coil connection-side terminal
7 conductor wire
8 terminal block
9 screw
10 thermocompression bonding portion
11 crimping portion
12 joint portion
13 positioning and heat-dissipating protrusion
15 terminal mount portion

The invention claimed is:

1. A motor wiring structure for supplying electric power to coils which are respectively wound around split cores provided in a stator, the structure comprising:
 a power supply-side terminal disposed on a power supply side;
 a plurality of coil connection-side terminals respectively thermocompression bonded to winding wire terminals of the coils; and
 a plurality of conductor wires each independently connecting the power supply-side terminal and one of the plurality of the coil connection-side terminals to each other, each of the plurality of conductor wires including one end connected to the power supply-side terminal and the other end singly connected to one of the coil connection-side terminals,
 wherein each of the plurality of coil connection-side terminals includes:
  a thermocompression bonding portion thermocompression bonded to the winding wire terminal of the coil,
  a crimping portion crimped to the conductor wire,
  a joint portion joining the thermocompression bonding portion and the crimping portion to each other, and
 a positioning and heat-dissipating protrusion formed on a part of the joint portion, between the thermocompression bonding portion and the crimping portion,
 wherein the positioning and heat-dissipating protrusion is positioned and fixed at a predetermined position with respect to the stator,
 wherein the positioning and heat-dissipating protrusion is configured to dissipate heat during thermocompression bonding the thermocompression bonding portion to the winding wire terminal of the coil by radiation.

2. The motor wiring structure according to claim 1, wherein
 a plate thickness of the crimping portion is smaller than a plate thickness of the thermocompression bonding portion.

3. The motor wiring structure according to claim 2, wherein
 the coil connection-side terminal is fixed with the positioning and heat-dissipating protrusion engaged in a terminal mount portion formed in a holder attached to the stator.

4. The motor wiring structure according to claim 1, wherein
 the positioning and heat-dissipating protrusion positioned and fixed at the predetermined position includes heat dissipation surfaces which are provided on both sides in a thickness direction of the positioning and heat-dissipating protrusion and exposed to dissipate heat of thermocompression bonding.

5. The motor wiring structure according to claim 1, wherein
 the positioning and heat-dissipating protrusion positioned and fixed at the predetermined position includes a heat dissipation surface which extends around the positioning and heat-dissipating protrusion and is exposed to dissipate heat of thermocompression bonding.

\* \* \* \* \*